Figure 1:
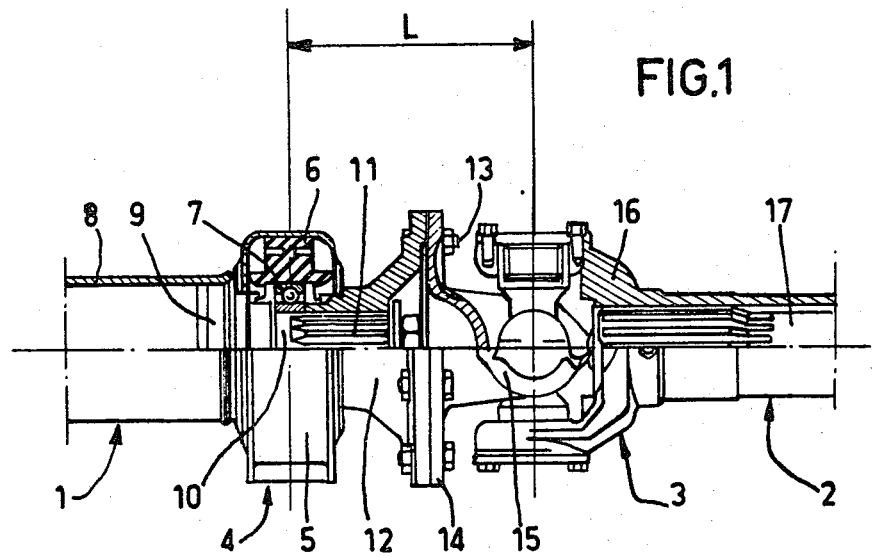

United States Patent [19]

Mangiavacchi

[11] 4,364,613
[45] Dec. 21, 1982

[54] INTERMEDIATE BEARING SUPPORT MOUNTING FOR SECTIONAL OR ARTICULATED DRIVE LINE

[75] Inventor: Jacques Mangiavacchi, Chatou, France

[73] Assignee: Glaenzer Spicer, Poissy, France

[21] Appl. No.: 142,711

[22] Filed: Apr. 22, 1980

[30] Foreign Application Priority Data

Apr. 24, 1979 [FR] France .............................. 79 10412

[51] Int. Cl.³ ............................................ F16C 27/00
[52] U.S. Cl. .................................. 308/184 R; 308/26; 180/70 P
[58] Field of Search ............................. 308/184 R, 26; 180/70 P

[56] References Cited

U.S. PATENT DOCUMENTS

| | | | |
|---|---|---|---|
| 2,857,974 | 10/1958 | Heller | 308/184 R X |
| 2,927,825 | 3/1960 | Stone | 180/70 P X |
| 2,933,354 | 4/1960 | Primeau | 308/184 R |
| 3,053,584 | 9/1962 | Dunn . | |
| 3,140,901 | 7/1964 | Young . | |
| 3,756,675 | 9/1973 | Mangiavacchi | 308/184 R |

FOREIGN PATENT DOCUMENTS

| | | |
|---|---|---|
| 822031 | 9/1937 | France . |
| 1102771 | 5/1955 | France . |
| 1117584 | 2/1956 | France . |
| 66979 | 5/1957 | France . |
| 1290685 | 3/1962 | France . |
| 578843 | 7/1958 | Italy .................................. 180/70 P |

*Primary Examiner*—William D. Martin, Jr.
*Attorney, Agent, or Firm*—Berman, Aisenberg & Platt

[57] ABSTRACT

An intermediate bearing support mounting for a sectional drive line is disclosed. The intermediate bearing support includes a cushion housing with an antifriction bearing. A coupling part, which may be a coupling flange or a jaw of a universal joint having detachable bearing pads, is fitted in the antifriction bearing and has a splined cylindrical shank telescoping in an internally splined sleeve fixed on a tubular drive section. The coupling part has, opposite the cylindrical shank, a separable connection with another drive section of the drive line, which may either be a plate with a centering bearing surface and threaded fasteners or the jaw of a universal joint having detachable bearing pads. This arrangement reduces the overhang of the universal joint in relation to the bearing support.

4 Claims, 3 Drawing Figures

U.S. Patent Dec. 21, 1982 Sheet 1 of 2 4,364,613

PRIOR ART

INTERMEDIATE BEARING SUPPORT MOUNTING FOR SECTIONAL OR ARTICULATED DRIVE LINE

The present invention relates to an intermediate or central bearing support mounting for a sectional or articulated drive line.

The invention relates more particularly to sectional drive lines jointed by means of universal joints.

When a drive line for connecting very distant members must rotate at high speeds, it is necessary to provide intermediate or center bearing supports which support the drive line proximate to its articulation points.

In conventional drive lines generally comprising a half drive section and a whole drive section articulated together by a universal joint, an intermediate bearing support supports the drive line proximate to the universal joint as disclosed in French Pat. No. 1,102,771.

The intermediate bearing supports customarily used typically comprise an antifriction bearing housed in a rubber cushion housing, the antifriction bearing being mounted on a splined terminal part welded to a tubular member, all of which are part of the half drive section. The connection with the second articulated drive section of the drive line is effected through a broached flange or jaw telescoped on the splines of the splined terminal part, and through a universal joint whose jaw is connected to the coupling flange, the other jaw of the universal joint being part of the drive.

This type of conventional bearing support mounting has numerous drawbacks. Indeed, the mounting of the coupling flange or jaw directly on the splines of the terminal part almost of necessity causes eccentricity of the centering of the flange as well as lack of perpendicularity of the plate thereof, these defects being due to customary manufaturing tolerances which cannot be reduced without considerably increasing the cost of the drive. Consequently, the combined effects of the eccentricity and the lack of perpendicularity of the plate introduces an eccentricity of the universal joint which is all the greater since the overhang of the universal joint in relation to the plate of the coupling flange is large. This eccentricity of the weight of the universal joint gives rise to an unbalance producing vibrations during the rotation of the drive.

The unbalance which is induced geometrically by the coupling of the half drive section to the whole drive section on mounting on a vehicle may at times reach a value ten times greater than the preliminary balancing tolerances of the parts and it will persist despite any efforts taken to achieve balance.

Various solutions have been proposed for overcoming these drawbacks. Thus, it has been contemplated to balance the half drive section beforehand with an extra weight which simulates the weight of the universal joint of the drive it is to be coupled to. According to another proposed solution, the coupling flange is mounted on the terminal part beforehand, then the centering bearing surface is machined on the plate of the coupling flange, so as to correct for an eccentricity and lack of perpendicularity of the plate due to the splines.

Finally, according to a third proposed solution, there is provided a simultaneous balance of the two drive members after they are coupled together; this solution poses considerable manipulation problems or may even require specially designed intermediate bearing supports. All these solutions are piecemeal and onerous.

By way of example, to illustrate the state of the art in this respect, let us cite the bearing support disclosed in French Pat. No. 822,031 in which the antifriction bearing is mounted on an intermediate coupling part which comprises one of the jaws of the universal joint providing the articulated connection between the drive sections. This arrangement is already an improvement over the bearing support mounting of the aforementioned French Pat. No. 1,102,771 in so far as it permits balancing of the half drive section prior to its being slidably mounted on the splines of the intermediate part. Nonetheless, these sliding splines introduce eccentricities due to the clearance required for sliding. In addition, the jaw of the universal joint received in the antifriction bearing does not permit the possibility of prior balancing of the second drive section and it is necessary to rebalance the assembly after assembly.

Likewise, U.S. Pat. No. 2,857,974 also teaches a bearing support mounting in which only a shaft section is disassemblable and therefore separately balanced, the other section being permanently fixed to the coupling part by a universal joint and therefore must be balanced with the same, thereby complicating the operation. Moreover, after mounting and assembly the two sections and the coupling part, it is once again necessary to balance the assembly.

An object of the present invention is therefore to provide a bearing support mounting for a sectional or articulated drive line permitting the balancing of the drive line sections before they are coupled and also to retain the balance after their coupling without any additional adjustment.

According to the invention there is provided an intermediate bearing support mounting for a sectional or articulated drive line of the kind having at least a first member with a hollow splined end and a second member coupled to the first member, wherein the intermediate bearing support mounting comprises a cushion housing of vibration absorbing elastic material, at least one antifriction bearing housed in the cushion housing and a coupling part fitted in the antifriction bearing and provided at one end with a splined cylindrical shank for telescoping in the splined hollow end of the first member, characterised in that the splined hollow end essentially comprises an internally splined sleeve fixed on the end of the first member, and the coupling part comprises opposite the splined shank separable means for connection with the second member.

Preferably, the separable means for connection with the second member essentially comprise a plate provided with a centering bearing surface and fastening bolts.

Owing to the use of a splined sleeve and separable means for connection with the second member, such as a plate with a centering bearing surface and fastening bolts on the other side of the bearing support, it is possible, in accordance with the invention, to balance the two sections of the drive shaft independently of each other and subsequently couple them without interfering with the independent balancing which in turn balances the assembly.

Alternatively, the coupling flange may be replaced by a universal joint jaw of the kind having detachable bearing pads, and comprising means for centering them on the jaw, therefore retains the balance of the coupled drive sections.

Preferably, the or each antifriction bearing and the splined sleeve are received beside one another along the cylindrical shank of the coupling part, the splined sleeve having a collar crimped in a groove formed at the free end of the cylindrical shank, the crimped collar axially blocking parts including the splined sleeve and the or each antifriction bearing on the cylindrical shank. Alternatively, the coupling part may have a central bore axially extending therethrough, a bolt traversing the coupling part through the central bore and threadedly engaging a nut crimped on the splined sleeve, the bolt and nut axially blocking parts received along the cylindrical shank including the splined sleeve and the or each antifriction bearing against one another.

The mounting according to the invention provides a very substantial reduction of the overhang of the center of the universal joint in relation to the center of the intermediate bearing support. The reduction of the axial dimension necessarily produces a lightening of the novel intermediate bearing support mounting. In addition the fact that the coupling part bears both the journal of the antifriction bearing for the support bearing and the centering bearing surface of the universal joint coupled thereto, offers the possibility of machining the journal, the centering bearing surface and, optionally, the bearing face of the plate perpendicular to the axis of the coupling part, thereby eliminating all eccentricity and lack of trueness, and at the same time the presence of some balancing weight.

Figure 2:
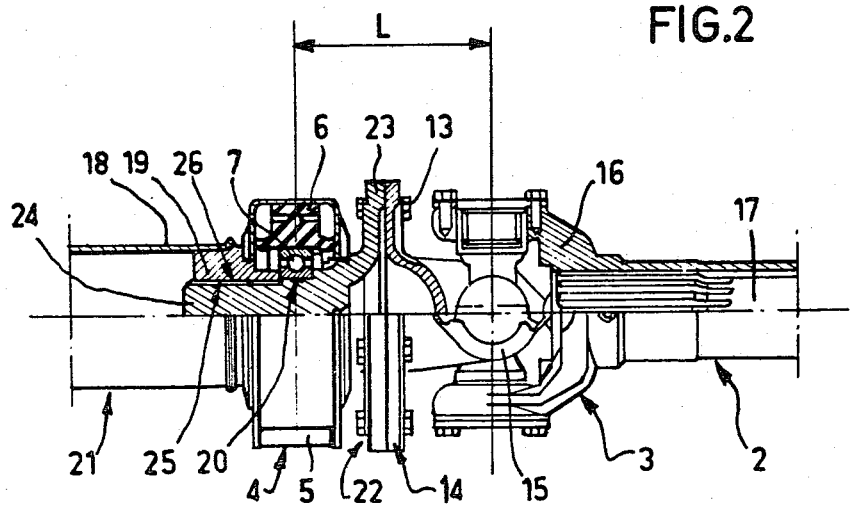
Figure 3:
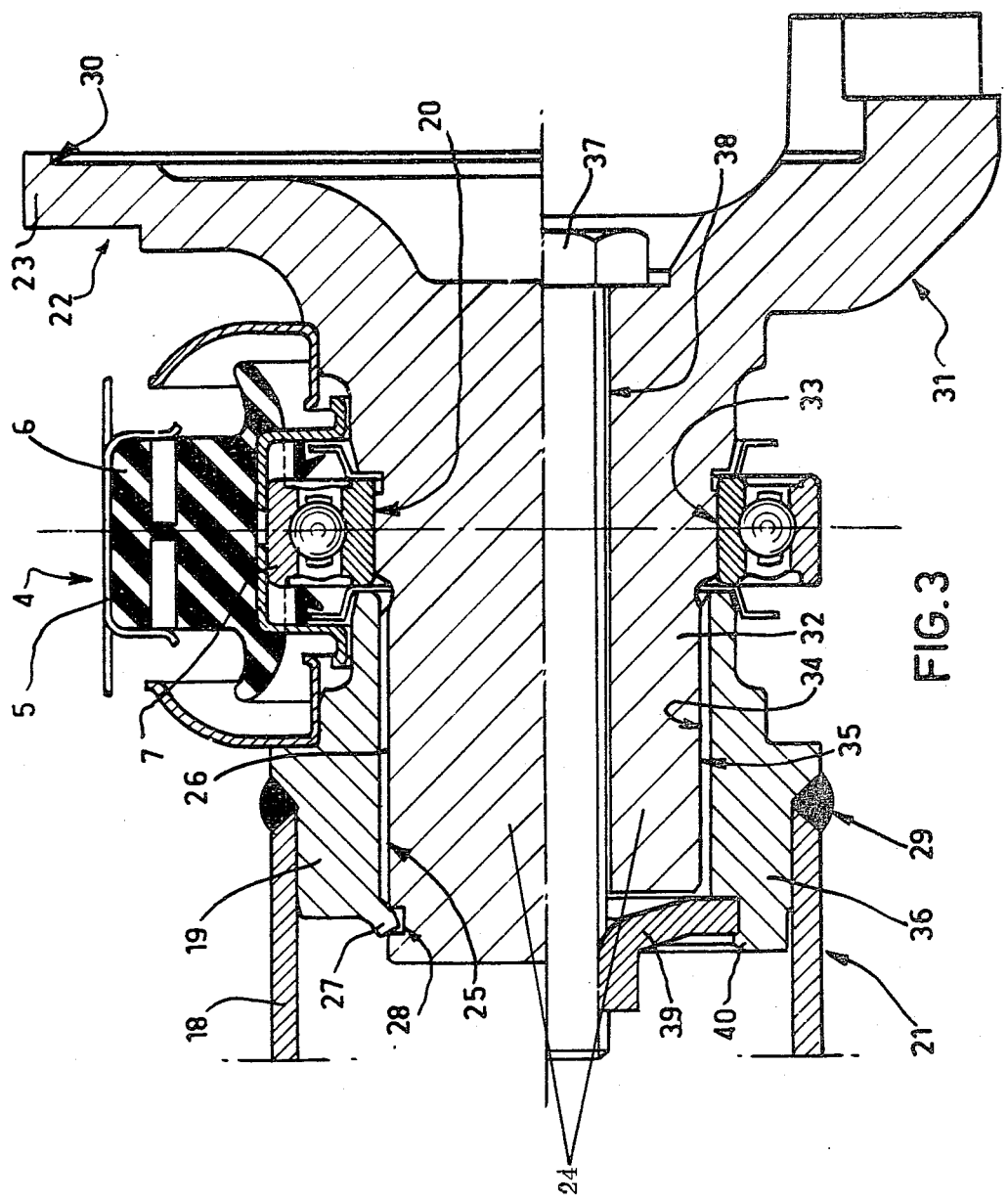

The invention is now going to be described in greater detail with reference to the embodiments, given by way of non-limiting examples, and illustrated in the accompanying drawings, in which:

FIG. 1 illustrates a conventional prior art intermediate bearing support mounting for a sectional or articulated drive line;

FIG. 2 illustrates an intermediate bearing support mounting embodying the invention, for a sectional or articulated drive line identical to that illustrated in FIG. 1; and FIG. 3 illustrates an enlarged longitudinal section of the intermediate bearing support mounting of FIG. 2, above the center line, and an alternative embodiment of the intermediate bearing support mounting embodying the invention, below the center line.

A conventional sectional or articulated drive line as illustrated in FIG. 1 generally comprises two drive sections, i.e. a half drive section 1 and a whole drive section 2, articulated end to end by means of a universal of Cardan joint 3, the drive line being supported by an intermediate bearing support 4 proximate to its point of articulation. The intermediate bearing support 4 generally comprises a sheet steel support 5 in which the cushion housing 6 of flexible elastic material such as rubber is housed, the housing 6 receiving a ball or roller bearing 7.

The half drive section 1 comprises a tubular drive member 8 at the end of which is fitted and welded a splined cylindrical terminal member 9 at the periphery of which are arranged in succession a bearing journal on which the inner ring of the antifriction bearing 7 is mounted and splines 11 opening onto the end of the terminal part 9. The splines 11 cooperate with complementary splines broached in the bore of a coupling flange 12 telescoping onto the splined end of the terminal part 9. The splines 11 cooperate with complementary splines broached in the bore of a coupling flange 12 telescoping onto the splined end of the terminal part 9.

The coupling flange 12 is fastened by fastening means or bolts 13 to the flange 14 of a jaw 15 of the universal joint 3, the other jaw 16 of the universal joint being slidably mounted on a splined drive shaft 17 of the whole drive section 2.

It will be noted that in this type of conventional sectional or articulated drive line the antifriction bearing or bearings 7 in the bearing support 4 and the coupling flange 12 are stacked in succession beside one another along the splined shank of the terminal part 9 of the half drive section 1, the coupling flange 12 being interposed between the antifriction bearing 7 of the bearing support 4 and the universal joint 3 coupled to the flange. There results a large overhang L between the center of the universal joint 3 and the center plane of the bearing support 10 for the antifriction bearing or bearings 7 which support and hold the drive.

With the embodiment of the bearing support mounting as illustrated in FIG. 2, the overhand L is reduced appreciably. Indeed, according to the invention, the antifriction bearing and the coupling flange are not juxtaposed at the end of the half drive section but on the contrary are superposed in the sense that the coupling flange comprises a cylindrical journal on which the antifriction bearing is mounted, whereby the distance between the journal and the bearing face on the coupling flange may be considerably reduced and at the same time the overhang of the universal joint.

If reference is made to the embodiment illustrated in FIG. 2, we see that the drive line according to this embodiment still comprises a half drive section 21 articulated to a whole drive section 2 through a universal joint 3, the drive line being supported proximate to the articulation point by a conventional bearing support 4. The conventional bearing support 4 comprises as is known a sheet steel support 5, a vibration absorbing rubber cushion housing 6 accomodated in the support and an antifriction bearing 7 housed inside the cushion housing. On the other hand, the coupling flange 22 comprises a coupling plate 23 extended along its axis by a cylindrical shank 24 at the periphery of which is formed a smooth cylindrical journal 20 adapted to receive the inner ring of the antifriction bearing 7, and splines 25 oriented longitudinally and opening onto the end of the shank 24 opposite the plate 23.

The half drive section 21 further comprises a tubular drive member 18 at the end of which is fitted and welded a sleeve 19 essentially formed by a sleeve the bore of which has splines 26 complementary to splines 25 of the flange 22, the sleeve 19 being adapted to telescope on the shank 24 of the flange.

As best seen in the enlarged portion of FIG. 3 located above the axis, the antifriction bearing 7 is mounted beforehand on its central journal 20 of the flange 22, then sleeve 19 is telescoped onto the splined end of the flange 22 so that its own splines 26 mesh and cooperate with the splines 25 of the flange. When the parts are stacked, the assembly is retained axially by crimping a collar 27 which is part of the terminal part 19 in a groove 28 formed circularly at the periphery of the end of the splined portion of the flange 22. The tubular drive member 18 of the half drive section 21 is then received on a peripheral centering cylindrical portion of the terminal part 19 then welded by a weld bead 29 to the terminal part.

The plate 23 of the coupling flange 22 comprises of course a centering bearing surface 30 permitting accurate positioning of the flange 14 of the jaw of the universal joint 3 with respect to the coupling flange 22.

Alternatively, in order to further reduce the overhang L of the universal joint 3 in relation to the bearing support 4, there is provided as illustrated in the part of FIG. 3 located below the axis, to use as a coupling part not a coupling flange as described above but a jaw 31 of the universal joint of the type having detachable bearing pads (not shown), articulatedly interconnecting the half drive section and the whole drive section making up the sectional or articulated drive line.

According to an embodiment of the invention the jaw of the universal joint having detachable bearing pads is of slightly special configuration to adapt to the intermediate bearing support 4 and the sleeve-like part 36 welded at the end of the tubular drive member 18 of the half drive section 21. The jaw comprises a cylindrical extension 32 at the periphery of which is formed in juxtaposed relation a smooth cylindrical journal 33 for the antifriction bearing or bearings 7 of the intermediate bearing support 4 and splines 34 oriented longitudinally and opening onto the end of the extension, the splines being adapted to cooperate with the complementary splines 35 broached inside the bore of the part 36 adapted to be welded to the end of the tubular member 18 of the half drive section 21.

After stacking the antifriction bearing for the bearing support and the splined sleeve on the extension of the jaw of the universal joint with detachable bearing pads, the parts may be blocked axially as above, i.e. crimped by a collar of the terminal part inside a groove formed at the periphery of the end of the extension, or blocked as represented in the lower part of FIG. 3 by means of a tie bolt extending through the jaw 31 via central bore 38 axially traversing the same and a nut 39 lodged in the rear end of the terminal part 36 and held in place by a crimped portion 40. Of course, this kind of blocking is not exclusively reserved for the mounting comprising a universal joint jaw, but may be used in the mounting comprising the coupling flange described previously, provided that a central bore is formed through the flange.

It will be noted that with the first mode of blocking which consists of crimping the collar of the sleeve into a groove of the coupling part, the coupling part is permanently attached after the terminal part is welded to the end of the tubular drive member of the half drive section. On the other hand with the second mode of axially blocking the parts of the stack it is obviously possible to unscrew the tie bolt 37 from the nut 39 of the welded terminal part at the end of the tubular drive member thereby permitting disassembly of the coupling member and, optionally, removing the antifriction bearing or bearings, e.g., for replacing them.

On the mounting of the intermediate bearing support according to the first embodiment in which the coupling part is a flange (the upper part of FIG. 3), the reduction of the overhang L from the center of the universal joint in relation to the center of the intermediate bearing support is of the order of 20% with respect to the conventional mounting illustrated in FIG. 1.

On mounting the intermediate bearing support of the alternative embodiment in which the coupling member is a jaw of a universal joint with detachable bearing pads (the lower part of FIG. 3), the reduction of the overhang L of the center of the universal joint in relation to the center of the intermediate bearing support may reach 35%, this alternative mounting also permitting a considerable lightening of the assembly at the bearing support, due to the elimination of several parts, notably a large number of bolts.

The reduction of the overhang of the universal joint in relation to the center of the intermediate bearing support added to the fact that the journals for the antifriction bearings are formed directly on the coupling part and therefore machined in one operation, bring about a substantial reduction of the eccentricities and the lack of perpendicularlity of the assembled parts proximate to the intermediate bearing support, thereby almost entirely eliminating the unbalance which may be caused by the coupling of the half drive section with the whole drive section.

The invention is of course not limited to the embodiments disclosed herein but encompasses all variations, alternatives and modifications without departing from the spirit and scope of the invention.

What I claim is:

1. An intermediate bearing support mounting for a sectional or articulated drive line including:
   at least a first member having an internally splined sleeve fixed on its end,
   a second member coupled to said first member,
   a cushion housing of vibration absorbing elastic material,
   at least one antifriction bearing housed in said cushion housing,
   a coupling part fitted in said antifriction bearing and being provided, at a first end, with a splined cylindrical shank for telescoping in said splined sleeve, and at a second end opposite said first end, with separable means for connecting said coupling member with said second member and centering said coupling member relative to said second member,
   said separable means for connection with the second member comprising a plate provided with a centering bearing surface and fastener means, and
   said antifriction bearing and said splined sleeve being received beside each other along said cylindrical shank of the coupling part, said splined sleeve having a collar crimped in a groove formed at the free end of said cylindrical shank, the crimped collar axially blocking parts including said splined sleeve and said antifriction bearing on said cylindrical shank.

2. An intermediate bearing support mount for a sectional or articulated drive line including:
   at least a first member having an internally splined sleeve fixed on its end,
   a second member coupled to said first member,
   a cushion housing of vibration absorbing elastic material,
   at least one antifriction bearing housed in said cushion housing,
   a coupling part fitted in said antifriction bearing and being provided, at a first end, with a splined cylindrical shank for telescoping in said splined sleeve, and at a second end opposite said first end, with separable means for connecting said coupling member with said second member and centering said coupling member relative to said second member,
   said separable means for connection with said second member comprising a jaw of a universal joint of the type having detachable bearing pads, and the pads thereof, and
   said antifriction bearing and said splined sleeve being received beside each other along said cylindrical shank of the coupling part, said splined sleeve having a collar crimped in a groove formed at the free end of said cylindrical shank, the crimped collar axially blocking parts including said splined sleeve and said antifriction bearing on said cylindrical shank.

3. An intermediate bearing support mounting for a sectional or articulated drive line including:
   at least a first member having an internally splined sleeve fixed on its end,
   a second member coupled to said first member,
   a cushion housing of vibration absorbing elastic material,
   at least one antifriction bearing housed in said cushion housing,
   a coupling part fitted in said antifriction bearing and being provided, at a first end, with a splined cylindrical shank for telescoping in said splined sleeve, and at a second end opposite said first end, with separable means for connecting said coupling member with said second member and centering said coupling member relative to said second member,
   said separable means for connection with the second member comprising a plate provided with a centering bearing surface and fastener means, and
   said antifriction bearing and said splined sleeve being received beside each other along said cylindrical shank of the coupling part, the coupling part further comprising a central bore axially extending therethrough, a threaded fastener means traversing the coupling part through said central bore and threadedly engaging a nut crimped on said splined sleeve, said threaded fastener means and said nut axially blocking parts received along said cylindrical shank including said splined sleeve and said antifriction bearing against one another.

4. An intermediate bearing support mounting for a sectional or articulated drive line including:
   at least a first member having an internally splined sleeve fixed on its end,
   a second member coupled to said first member,
   a cushion housing of vibration absorbing elastic material,
   at least one antifriction bearing housed in said cushion housing,
   a coupling part fitted in said antifriction bearing and being provided, at a first end, with a splined cylindrical shank for telescoping in said splined sleeve, and at a second end opposite said first end, with separable means for connecting said coupling member with said second member and centering said coupling member relative to said second member,
   said separable means for connection with said second member comprising a jaw of a universal joint of the type having detachable bearing pads, and the pads thereof, and
   said antifriction bearing and said splined sleeve being received beside each other along said cylindrical shank of the coupling part, the coupling part further comprising a central bore axially extending therethrough, a threaded fastener means traversing the coupling part through said central bore and threadedly engaging a nut crimped on said splined sleeve, said threaded fastener means and said nut axially blocking parts received along said cylindrical shank including said splined sleeve and said antifriction bearing against one another.

* * * * *